United States Patent [19]

Brunner

[11] Patent Number: 4,617,962
[45] Date of Patent: Oct. 21, 1986

[54] HYDRAULIC DEVICE

[75] Inventor: Rudolf Brunner, Baldham, Fed. Rep. of Germany

[73] Assignee: Heilmeier & Weinlein Fabrik fur Oel-Hydraulik GmbH & Co., KG, Munich, Fed. Rep. of Germany

[21] Appl. No.: 649,684

[22] Filed: Sep. 12, 1984

[30] Foreign Application Priority Data

Sep. 20, 1983 [DE] Fed. Rep. of Germany ....... 3333967

[51] Int. Cl.$^4$ .................. F15B 21/04; F16K 47/02
[52] U.S. Cl. .................. 137/613; 137/513.5; 137/596.13; 137/614.18; 181/233; 181/278
[58] Field of Search ............ 91/446; 137/513.5, 596.1, 137/596.13, 596.2, 613, 614.18, DIG. 2; 181/233, 241, 277, 278

[56] References Cited

U.S. PATENT DOCUMENTS

| 2,206,259 | 7/1940 | Nield et al. | 181/233 |
| 3,323,615 | 6/1967 | Kessler | 181/278 X |
| 3,595,265 | 7/1971 | Cryder | 137/513.5 |
| 3,722,543 | 3/1973 | Tennis | 137/596.12 |
| 4,140,152 | 2/1979 | Budzich | 137/596.13 X |
| 4,178,962 | 12/1979 | Tennis | 137/576.13 |
| 4,222,409 | 9/1980 | Budzich | 137/596.13 |

FOREIGN PATENT DOCUMENTS

| 125837 | 11/1901 | Fed. Rep. of Germany . |
| 2542665 | 5/1977 | Fed. Rep. of Germany . |
| 3147000 | 6/1983 | Fed. Rep. of Germany . |
| 3308575 | 9/1984 | Fed. Rep. of Germany . |
| 42246 | 11/1965 | German Democratic Rep. . |

Primary Examiner—Gerald A. Michalsky
Attorney, Agent, or Firm—Kinzer, Plyer, Dorn & McEachran

[57] ABSTRACT

This invention relates to a hydraulic device comprising at least one adjustable working, control or regulating member between a pressure source (3) and the flow path of an outlet (5,R), said member establishing an unrestricted connection to a passage in one position with the pressure medium which is present flowing out via said connection by expanding. In the case of high working pressures and/or great quantities of delivery, a loud noise develops in such hydraulic devices throughout the whole flow path of the outlet when the jet flows out. According to this invention, this is prevented by a jet disturbing means (6) being arranged after said member and having a jet disturbing element (31) which is adapted to be biased, which is directed to the jet and adjustable in dependence of the pressure to be reduced from a ready position into working positions in which it increasingly disrupts the jet, said jet disturbing element (31) automatically taking up its ready position as soon as the pressure to be reduced approximately corresponds to the pressure behind the jet disturbing means (6).

18 Claims, 6 Drawing Figures

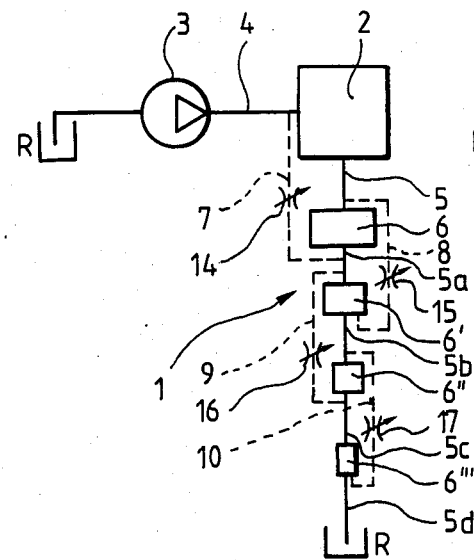
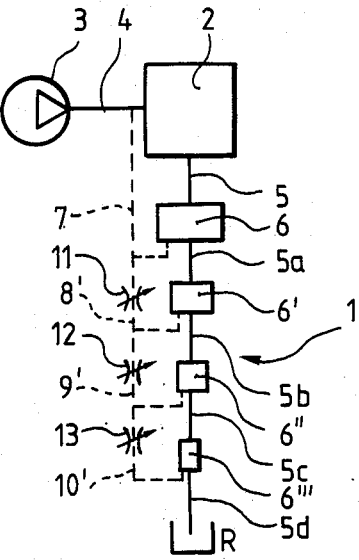
Fig. 1    Fig. 2
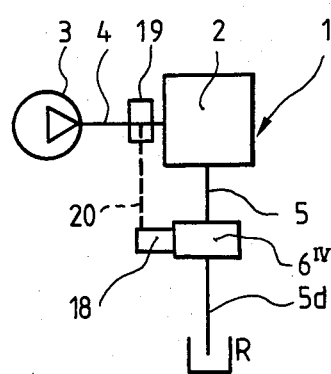
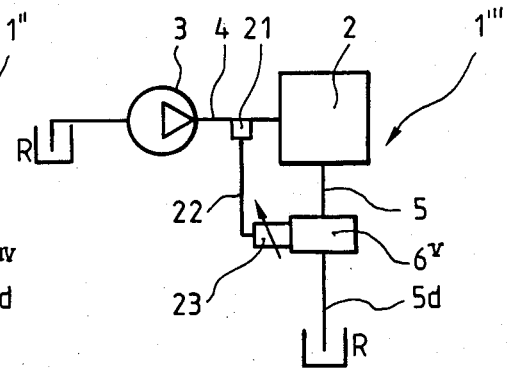
Fig. 3    Fig. 4

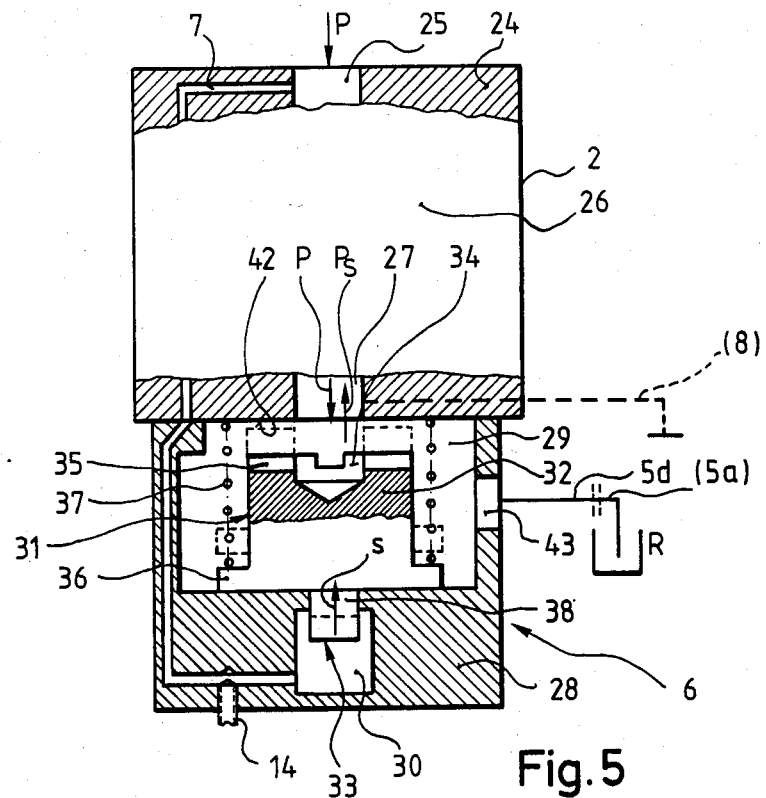
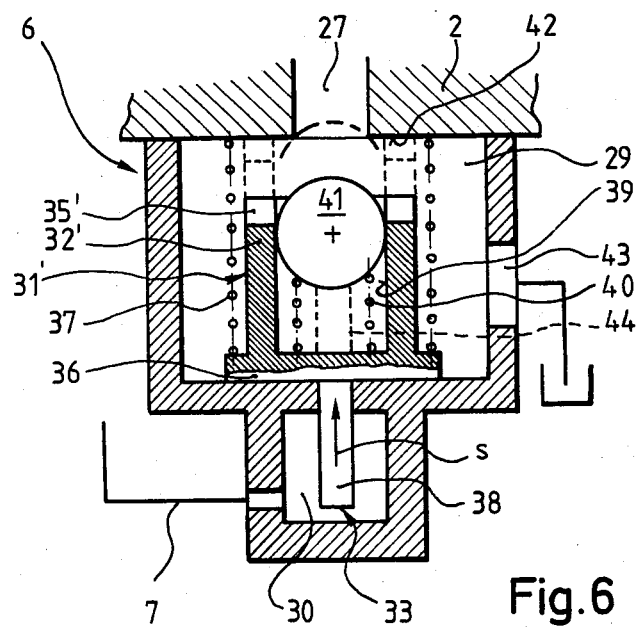

HYDRAULIC DEVICE

DESCRIPTION

This invention relates to a hydraulic device of the type set forth in the preamble of the main patent claim.

A disturbing noise development occurs in such hydraulic devices whenever the pressure medium at a high working pressure and maybe at a great quantity of delivery rapidly flows out into the discharge by expanding. The noise development is probably due to a cavitation effect in the jet which arises and to the propagation of the dynamic jet through the whole flow path. The stronger the jet is or the smaller the counterpressure in the flow path section behind the expansion portion, the more noticeable the noise development becomes. The working, control or regulating members which are provided in the hydraulic device may, for instance, be slide control valves in single or series arrangement, hydromotors, working cylinders, safety valves, flow governor valves and similar hydraulic components wherein a switch position occurs in which the pressure medium suddenly starts to flow out into the discharge. For instance, in the case of slide control valves with unrestricted passage, the piston slide has a through flow passage which is shut off in the control positions of the piston slide and which in the neutral central position lets the pressure medium flow out in the unrestricted passage. When switching over from a control position to the neutral position, the pressure medium must all of a sudden flow out under the working pressure whereby a strong jet forms which despite diversions and narrowings scarcely diffuses in the desirably low resistance flow path. In the present case, this takes place via two passages, which open in a baffle-like manner, from the housing into the channel of the piston slide and again from the channel of the piston slide into the housing and to the reservoir. Similarily, when the adjusted pressure limit is exceeded, the pressure medium in a safety valve suddenly flows out via the valve element of the safety valve by forming a loud jet. In both cases, the outflow virtually takes place without any counterpressure. In the case of delivery quantities which are greater than 30 liter/min a distinct and loud noise occurs. One possibility of silencing the noise would be a counterpressure acting against the outflowing jet of the pressure medium as is usual in the case of so-called decompression valves (German Offenlegungsschrift No. 25 42 665 for preventing pressure impacts and their mechanical damage. However, this principle is not suited for the above-mentioned hydraulic device because after the initial pressure reduction it is absolutely necessary that the pressure medium flow out at a flow resistance which is as low as possible.

It has already been suggested (German Patent Application No. P 33 08 575) that in the case of slide control valves with unrestricted passage) the noise development be reduced by means of two differently sized throttle positions which form via the slide of this valve when it moves so that there is a greater pressure difference in the first throttle position than in the second throttle position. The result thereof is that a greater portion of the high pressure before the first throttle position is reduced in the first throttle position than in the second throttle position. The counterpressure which then acts against the pressure medium before the second throttle position silences the noise development behind the first throttle position while in the second throttle position the flow noise or expansion noise of the pressure medium is low owing to the pressure difference which is now small there although the pressure medium can virtually expand without any counterpressure. Apart from the fact that, because of this, the construction of the slide control valve becomes more expensive, a careful coordination of the respectively chosen construction with the working pressure area and the quantity of delivery is required. Despite this, the achievable noise silencing is still unsatisfactory because the two throttle positions are controlled in strict dependence of the movement of the piston slide and operate independent of the pressure and the quantity of delivery and produce a jet.

The object of the invention is to provide a hydraulic device of the type cited at the outset wherein the jet noise is eliminated and the expanded pressure medium flows out without any significant flow resistance.

In the case of this development, the jet disturbing means actually only becomes operative whenever there is a strong jet, i.e., in dependence of the pressure which causes the formation of the jet. In this case, it does not matter how the adjusting movement of the member takes place or via which stroke but the jet disturbing means immediately interrupts the jet when it issues from the passage so that it cannot propagate into the outflow path and generate noises. As soon as the pressure before the member approximately corresponds to the pressure behind the jet disturbing means and the jet is correspondingly weak, the jet disturbing element takes its ready position up again in which it allows the necessary unrestricted outflow of the pressure medium which, for instance, is absolutely necessary in the case of a control slide with unrestricted through flow. A constructional coordination of the members of the hydraulic device with the jet disturbing means is not required because this means is only directed towards the jet to be disturbed. The jet arising from the member between the pressure source and the flow path of the outlet is effectively diffused by the jet disturbing element while a noise development is suppressed in the flow path of the outlet. Even in the ready position in which the outflow is almost unrestricted, the jet disturbing element disturbs the propagation of the weak jet.

An expedient embodiment of the invention is that if a jet disturbing means for the noiseless outflow of the pressure medium is not sufficient, for instance, because the quantity of delivery or the working pressure is too high for this purpose, at least one additional jet disturbing means which further disturbs the propagation of the jet is arranged behind the jet disturbing means. Each additional jet disturbing means is biased by the pressure which is present before the jet disturbing means which is in front of it in such a way that an effective jet disturbance is again obtained which provides a noise silencing irrespective of the pressure which really exists. Since the additional jet disturbing means also moves into its ready position whenever the flow of the jet is weakened, a significant flow resistance is no longer set against the outflow of the pressure medium. In this case, it is conceivable that the pressure biasing the jet disturbing element of each jet disturbing means is also centrally only derived via the member from the pressure which is present in front of the member and is here controlled such that each jet disturbing means individually disturbs the propagation of the jet.

A further expedient embodiment of the invention is one in which the adjusting force for the jet disturbing element is controlled in dependence of the pressure to be reduced so that in the case of a higher pressure to be reduced the adjusting force also increases by means of which the jet disturbing element has a noise-silencing effect on the jet.

A further constructionally simple and effective embodiment of the invention is embodied in the case of a differential piston, in which a relatively small abutment surface is sufficient to produce an adjusting force which changes in dependence of the pressure and which is again responsible for the counterpressure for disturbing the jet. The jet refraction surface refracts the flowing pressure medium jet so much that it cannot propagate with noise. The disturbing effect of the jet disturbing element becomes in particular operative in the case of an embodiment in which swirling is forced.

Alternatively, another embodiment is one in which the pressure to be reduced is tapped off again and the adjusting force for the jet disturbing element is produced therefrom, however, not directly in a hydraulic manner, but mechanically or electromagnetically. This could, for example, be expedient when for constructional reasons a hydraulic connection between the pressure connection to the member and the jet disturbing means which is downstream thereof is not possible.

It may also be of importance that a weak spring takes care that the jet disturbing element remains in the ready position when the hydraulic device is put into operation.

Another embodiment is one in which the pressure medium can also flow out when the passage is completely covered by the jet disturbing element. The disturbing effect is then particularly great. The jet is affected in dependence of the quantity of through flow.

As an alternative thereto, the jet is refracted irrespective of the quantity of through flow because in this case the disturbance of the jet also depends on the bias which is applied to the valve element through the spring.

In the foregoing case, inexpedient vibrations of the valve element may be suppressed thereby.

A further important aspect of the invention is that a certain surface difference guarantees that after the expansion of the pressure medium, and when the jet is weakened, the force impulse acting on the jet refraction surface through flow dynamics rapidly brings the differential piston into the ready position. Noise silencing is obtainable by means of the principle that the jet disturbing elements have a ratio to each other determined by the square root of the respective pressures to be reduced.

Embodiments of the invention will hereinafter be explained with reference to the drawings.

There is shown in:

FIG. 1 a schematic view of a first embodiment of a hydraulic device,

FIG. 2 a schematic view of a second embodiment of a hydraulic device,

FIG. 3 a schematic view of a third embodiment of a hydraulic device,

FIG. 4 a schematic view of a fourth embodiment of a hydraulic device,

FIG. 5 a detail, partly a sectional view, from the preceding embodiments of hydraulic devices, and FIG. 6 a sectional view of a detail variant.

In the case of a hydraulic device 1 according to FIG. 1 a working, control or regulating member 2 is acted upon by a pump 3 with a pressure medium from a reservoir R via a pressure pipe 4. The member 2 may be a slide control valve with a piston slide, a safety valve, a flow governor valve or suchlike. There may also be several slide control valves, safety valves or suchlike which are combined in a battery-like manner and which are connected to a common discharge pipe 5 which is connected to a reservoir R via pipe branches 5a, 5b, 5c, and 5d, i.e., via jet disturbing means 6, 6', 6", 6''' which are arranged in series therein. In comparison with the pressure pipe 4 there is a substantially lower pressure or no pressure at all in the discharge pipe 5 when the member 2 properly operates such that it interrupts the connection between the pipes 4 and 5, and, in return, supplies the pressure from the pipe 4 to other users, for instance, or monitors as a safety valve the pressure in the pressure pipe 4.

In the member 2 or before the member 2 a control line which on the side facing away from the discharge pipe 5 opens into the first jet disturbing means 6 branches off from the pressure pipe 4. In front of the first jet disturbing means 6 a further control line 8 which on the side of the second jet disturbing means 6' which faces away from the discharge pipe section 5 is connected thereto branches off from the discharge pipe 5. In front of the second jet disturbing means 6' a further control line 9 which on the side facing away from the discharge pipe section 5b is connected to the third jet disturbing means 6" branches off from the discharge pipe section 5a. Finally, in front of the third jet disturbing means 6" a further control line 10 which on the side facing away from the discharge pipe section 5c is connected to the fourth jet disturbing means 6''' branches off from the discharge pipe section 5b.

Throttles 14, 15, 16 and 17, expediently adjustable throttles, may be arranged in the control lines 7, 8, 9 and 10.

Embodiments of the first jet disturbing means 6 can in detail be seen from FIGS. 5 and 6. The additional jet disturbing means 6', 6", 6''' correspond to the jet disturbing means 6 with regard to their structure so that it is not necessary to explain them in detail.

According to FIG. 5, the member 2 has a cuboid housing 24 with a pressure pipe connection 25 and a discharge pipe passage 27 between which (not shown) the active elements of the member such as a piston slide, a triggerable valve element, a proportional magnet with proportioning means and suchlike are arranged.

In the area of the passage 27 a seat is integrated on the housing 24, for example, by a special processing. At this side of the housing 24 an additional housing 28 is mounted on the jet disturbing means 6. The housing 28 comprises a chamber 29 as well as a pre-control chamber 30. The pre-control chamber 30 is in flow communication with the pressure pipe connection 25 via the control line 7. The throttle 14 is represented as a headless pin by means of which it is possible to change the passage through the control line 7.

In chamber 29 a jet disturbing element 31 is arranged which is designed as a differential piston. The one side which is larger in the abutment surface is designed as a jet refraction surface 32 while the other side 33 is arranged on a piston 38 which separates the pre-control chamber 30 from the chamber 29 and limits the pre-control chamber 30.

In the jet refraction surface 32 a recess 34 is provided on the side facing the discharge passage 27 from which notches which extend radially outwards define recesses 35 the purpose of which will be explained later on. A weak spring 37 is supported on one shoulder 36 of the element 31 and its other end is, for example, adjacent to the housing 24. The spring 37 exerts a weak force on the element 31 so that it remains in the position as drawn (ready position) in which a substantially unrestricted flow connection between the passage 27 and a discharge connection 43 is open in the housing 28. However, in this position the element has a disturbing effect on the jet as well without producing a significant counterpressure. According to FIG. 5 the discharge pipe section 5d which directly leads to the reservoir R is connected to the discharge connection 43. This applies to a hydraulic device wherein only one single jet disturbing means 6 is provided. According to FIG. 1, however, the second jet disturbing means 6' is connected to the discharge connection 43 and the discharge pipe section 5a. The pre-control pressure for the second jet disturbing means 6' which is not shown in FIG. 5 is then, for example, tapped off via the pre-control line 8 branching off from the discharge pipe connection 27.

The hydraulic device (comprising only one jet disturbing means 6) according to FIGS. 1 and 5 operates as follows:

When the flow connection between the pressure pipe connection 25 and the passage 27 is interrupted by the member, there is a high pressure in the pressure pipe connection 25. This pressure will also be present in the pre-control chamber 30 via the control line 7 where it will displace the element from the ready position drawn in unbroken lines via the side 33 until the jet refraction surface 32 is adjacent to the seat 42. Possibly leaking oil can nevertheless flow out in a substantially unhindered manner to the discharge pipe section 5d because the recesses 35 keep a constantly open connection open. There is no significant pressure in the discharge pipe connection 27 but the pressure of the reservoir R.

When the member 2 is now brought into a position wherein it establishes the flow connection between the pressure pipe connection 25 and the passage 27, the pressure P on the pressure of the reservoir must be reduced, i.e., the pressure medium expands. A strong jet which forces the element 31 into the ready position as drawn forms from the pressure pipe connection 25 via the passage 27. However, an adjusting force S which is produced via the pressure in the pre-control chamber 30 on the side 33 of the element 31 acts against this. The higher the pressure is, the greater the adjusting force is as well so that an increasing disturbing effect is produced on the basis of which a counterpressure $P_S$ builds up. The jet breaks up and cannot freely propagate from the passage 27 into the discharge pipe and therefore it can no longer produce a disturbing noise. The jet refraction surface 32 operates together with the seat 42 and forms a kind of throttle position having a jet disturbing effect.

In this case, it is of importance that the counterpressure $P_S$ against the pressure P is always built up in dependence of the force of P, and consequently, when the pressure P decreases, the counterpressure $P_S$ decreases as well. A quantity-controlled outflow of the pressure medium takes place through the recesses 35 of the jet refraction surface 32 in dependence of the ratio of the pressure P to the pressure $P_S$ with the counterpressure $P_S$ being in accordance with the dimension of the side 33 of the differential piston which defines the working element 31. The strong jet is disrupted.

If minor individual jets which still lead to a noise development because they propagate still arise from the jet, then it is expedient to provide at least one further jet disturbing means 6'.

When in the case of the jet disturbance the pressure reduction is now so much advanced that there is approximately the same pressure in the pressure pipe connection 25 as in the chamber 29 and in the discharge connection 43, respectively, the adjusting force S is then so small that the flow dynamics from the passage 27 is sufficient to move back again the jet disturbing element 31 into the drawn ready position in which although an effect on the jet still exists the discharge resistance is negligibly small. This is in particular important, for example, in the case of the slide control valves in the position for unrestricted through flow because the pump 3 is to pump the pressure medium at a flow resistance which is to be as low as possible through the whole hydraulic device into the reservoir so that energy is not unnecessarily wasted and the pressure medium is not heated.

The jet disturbing element 31 could also be moved from a lateral ready position having a negligible effect crosswise into the path of the jet from the passage 27 to produce the effect aimed at.

In the case of the embodiment of the first jet disturbing means 6 according to FIG. 6 the jet is disturbed between the passage 27 and the discharge connection 43 in dependence of the pressure and not in dependence of the quantity as in the case of the embodiment according to FIG. 5. This is obtained by means of the element 31 which in the jet refraction surface 32' has a deep, pot-like recess 39 in which a valve element 41 biased by a strong spring 40 is displaceable.

The valve element 41 is here designed as a globe which can so far be forced outwardly by the spring 40 from the recess 39 that it closes the passage 27 with its circumference as soon as the element 31 is adjacent to the seat 42 together with the jet refraction surface 32' means of the adjusting force S. The jet must then first of all press back the valve element 41 into the recess 39 before the pressure medium can flow out via the recesses 35'. The jet will be disturbed in dependence of the force of the spring 40 until the pressure in the discharge pipe connection 27 has completely pressed back the valve 41 into the recess 39. It is not until thereafter that the outflow of the pressure medium through the recesses 35' is also quantity-controlled.

As soon as the pressure on the pressure pipe connection 25 has so much reduced that it approximately corresponds to the pressure in the discharge connection 43, the element 31 will be displaced into the drawn ready position by the dynamic force of the flow so that the pressure medium will flow out in a relatively unhindered manner.

It is also possible to combine the jet disturbing means 6 according to FIG. 6 with further throttle means which may be assembled either in the same way or in accordance with FIG. 5.

FIG. 2 shows another embodiment of a hydraulic device 1' in which the individual jet disturbing elements of the jet disturbing means 6, 6', 6'', 6''' are triggered in another manner than in the one according to FIG. 1. In this case, the control line 8, then the control line 9 and eventually from this line the control line 10 are immediately acted upon by the pre-control line 7. In the lines 8', 9' and 10' throttles 11, 12 and 13 are arranged—preferably in an adjustable manner. Moreover simple valve means (not shown) can be incorporated in the control lines so that the pre-control pressures for the elements of the further jet disturbing means are controllable in dependence of the pressure as explained in FIGS. 1 and 5.

In the case of the embodiment of FIG. 3 only one single jet disturbing means $6^{IV}$ is arranged after the member 2. However, it would also be conceivable that several jet disturbing means of this type are subsequently arranged. The jet disturbing means $6^{IV}$ has a mechanical actuator 18 which is connected to a pressure receiver 19 via a transmission connection. In this case, it would be conceivable that an adjusting force which is dependent on the respective pressure in the pressure pipe 4 is transmitted to the mechanical actuator by means of a lever connection from the pressure receiver 19 via the transmission 20; this actuator then moves the jet disturbing element in dependence of the pressure in the pressure pipe 4 in the manner mentioned hereinbefore.

According to FIG. 4 again, only one single jet disturbing means $6^V$ is arranged after the member 2 with a pressure converter 21 being arranged in this hydraulic device 1''' in the pressure pipe 4 and converting the pressure in the pressure pipe 4 into an electrical signal and supplying it via a line 22 to an operating magnet 23, preferably a proportional magnet, which is connected to the jet disturbing means $6^V$ in a constructional manner. In this way an electrical signal which depends on the pressure in the pressure pipe 4 is used to vary the adjusting force for the jet disturbing element of the jet disturbing means $6^V$ and to move the jet disturbing means in such a way as explained in FIGS. 1, 5 and 6.

It is obvious that additional jet disturbing means can also be arranged after the jet disturbing means $6^V$ when the pressure to be reduced is on the whole so high or the quantity of delivery so great that by means of the jet disturbing means $6^V$ alone the noise development of the jet cannot be suppressed in a satisfactory manner.

The throttle effect in each jet disturbing means is of secondary importance because it is of foremost importance to prevent in advance the noisy propagation of the jet forming into the outflow path; this is effectively achieved by means of the jet disturbing element corporeally interfering with the jet. However, the jet disturbing element must stop or at least considerably reduce its effect when on account of the jet which is at any rate uncritical with regard to its noise an undisturbed outflow is needed.

I claim:

1. A hydraulic device comprising at least one adjustable working control or regulating member (2) which is arranged between a high pressure source (P) and an outflow path (43) and is movable into at least one position in which a jet is formed via a passage intersecting said outflow path, characterized in that at least one jet disturbing means (6) having a jet disturbing element (31) is arranged adjacent the intersection of said passage and said outflow path, said jet disturbing element being movable between a ready position free of the intersection into a disturbing position at the intersection of said passage and said outflow path, means biasing said element to its ready position so that said passage is normally undisturbed by the influence of said element, said jet disturbing element having a jet disturbing face (32) being movable with the jet disturbing element into the jet, means for applying an adjusting force to the element to displace the element from ready position which displacement in distance depends on and varies with the pressure of said high pressure source, means constantly maintaining an open connection between said passage and said outflow path regardless of the distance the adjusting force displaces the element from its ready position, biasing means returning said element to said ready position as soon as the pressure from said high pressure source approximately has dropped to the pressure in said outflow path, and further characterized in that in said outflow path (R) behind said jet disturbing means (6) at least one further similar jet disturbing means (6', 6'', 6''') is arranged, the jet disturbing element thereof being adjustable from its ready position in dependence of the pressure before the preceding jet disturbing means (6, 6', 6'').

2. A hydraulic device according to claim 1, characterized in that said jet disturbing means (6, 6', 6'', 6''') has a chamber (29) in one outflow path (5, 5a, 5b, 5c, 5d) wherein a seat (42) is provided in the area of the outlet of said passage (27), and that in said chamber (29) said jet disturbing element is adapted to be actuated until it is adjacent to said seat (42) by said adjusting force (S) varying in dependence of the pressure.

3. A hydraulic device according to claim 2, characterized in that said jet disturbing element is a differential piston acting on both sides, one side of said piston being developed as a jet refraction surface which cooperates with said seat (42) and is substantially transversely to the direction of said jet, and the other opposite side (33) of said piston limiting a pre-control chamber 30 which is acted upon with a pre-control pressure which is derived from the pressure (P) before said member (2).

4. A hydraulic device according to claim 3, characterized in that said jet refraction surface is recessed.

5. A hydraulic device according to claim 3, characterized in that open recesses which keep open a predetermined cross section of said passage for said outflow path when said jet disturbing element is adjacent to said seat (42) are provided in said jet refraction surface of said jet disturbing element transversely to the direction of said jet.

6. A hydraulic device according to claim 3, characterized in that said side (33) of said differential piston limiting said pre-control chamber (30) is substantially smaller than said jet refraction surface (32) exposed to said jet in said chamber (29).

7. A hydraulic device according to claim 1, characterized in that said jet disturbing element is in operative communication with an adjusting means by means of which said adjusting force (S) for said jet disturbing element is producable.

8. A hydraulic device according to claim 1, characterized in that said jet disturbing element is biased by a weak spring (37) in the direction of its ready position.

9. A hydraulic device according to claim 1, characterized in that said jet disturbing means (6, 6', 6'', 6''') has a chamber (29) in one outflow path (5, 5a, 5b, 5c, 5d) wherein a seat (42) is provided in the area of the outlet of said passage (27), and that in said chamber (29) said jet disturbing element is adapted to be actuated until it is adjacent to said seat (42) by said adjusting force (S) varying in dependence of the pressure before said member (2).

10. A hydraulic device according to claim 9, characterized in that said jet disturbing element is a differential piston acting on both sides, one side of said piston being developed as a jet refraction surface which cooperates with said seat (42) and is substantially transversely to the direction of said jet, and the other opposite side (33) of said piston limiting a pre-control chamber (20) which is acted upon with a pre-control pressure which is derived from the pressure (P) before said member (2).

11. A hydraulic device according to claim 10, characterized in that said jet refraction surface is recessed.

12. A hydraulic device comprising at least one adjustable working control or regulating member (2) which is arranged between a high pressure source (P) and an outflow path (43) and is movable into at least one position in which a jet is formed via a passage intersecting said outflow path, characterized in that at least one jet disturbing means (6) having a jet disturbing element (31) is arranged adjacent the intersection of said passage and said outflow path, said jet disturbing element being movable between a ready position free of the intersection into a disturbing position at the intersection of said passage and said outflow path, means biasing said element to its ready position so that said passage is normally undisturbed by the influence of said element, said jet disturbing element having a jet disturbing face (32) being movable with the jet disturbing element into the jet, means for applying an adjusting force to the element to displace the element from ready position which displacement in distance depends on and varies with the pressure of said high pressure source, means constantly maintaining an open connection between said passage and said outflow path regardless of the distance the adjusting force displaces the element from its ready position, biasing means returning said element to said ready position as soon as the pressure from said high pressure source approximately has dropped to the pressure in said outflow path, characterized in that said jet disturbing means has a chamber (29) in one outflow path wherein a seat (42) is provided in the area of the outlet of said passage (27), and that in said chamber (29) said jet disturbing element is adapted to be actuated until it is adjacent to said seat (42) by said adjusting force (S) varying in dependence of the pressure.

13. A hydraulic device according to claim 12, characterized in that said jet disturbing element is a differential piston acting on both sides, one side of said piston being developed as a jet refraction surface which cooperates with said seat (42) and is substantially transversely to the direction of said jet, and the other opposite side (33) of said piston limiting a pre-control chamber (20) which is acted upon with a pre-control pressure which is derived from the pressure (P) before said member (2).

14. A hydraulic device according to claim 13, characterized in that said jet refraction surface is recessed.

15. A hydraulic device according to claim 13, characterized in that said jet disturbing element is biased by a weak spring (37) in the direction of its ready position.

16. A hydraulic device according to claim 13, characterized in that open recesses which keep open a predetermined cross section of said passage for said outflow path when said jet disturbing element is adjacent to said seat (42) are provided in said jet refraction surface of said jet disturbing element transversely to the direction of said jet.

17. A hydraulic device according to claim 13, characterized in that said side (33) of said differential piston limiting said pre-control chamber (30) is substantially smaller than said jet refraction surface (32) exposed to said jet in said chamber (29).

18. A hydraulic device according to claim 12, characterized in that said jet disturbing element is in operative communication with an adjusting means by means of which said adjusting force (S) for said jet disturbing element is producible.

* * * * *